June 14, 1960 — W. J. BISCHOF — 2,941,183
MULTI-RANGE ECHO SOUNDING SYSTEM
Filed Dec. 3, 1956
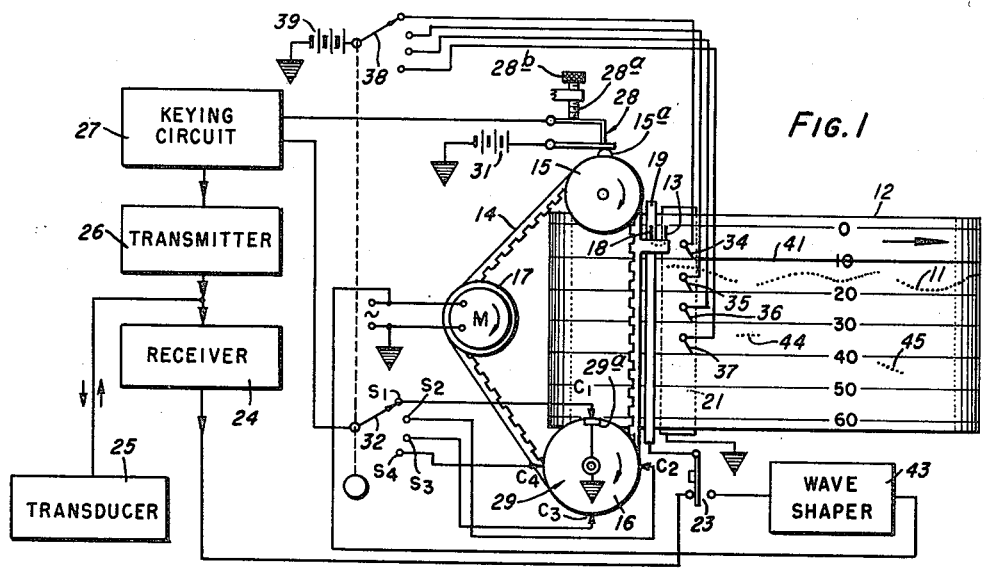
Fig.1
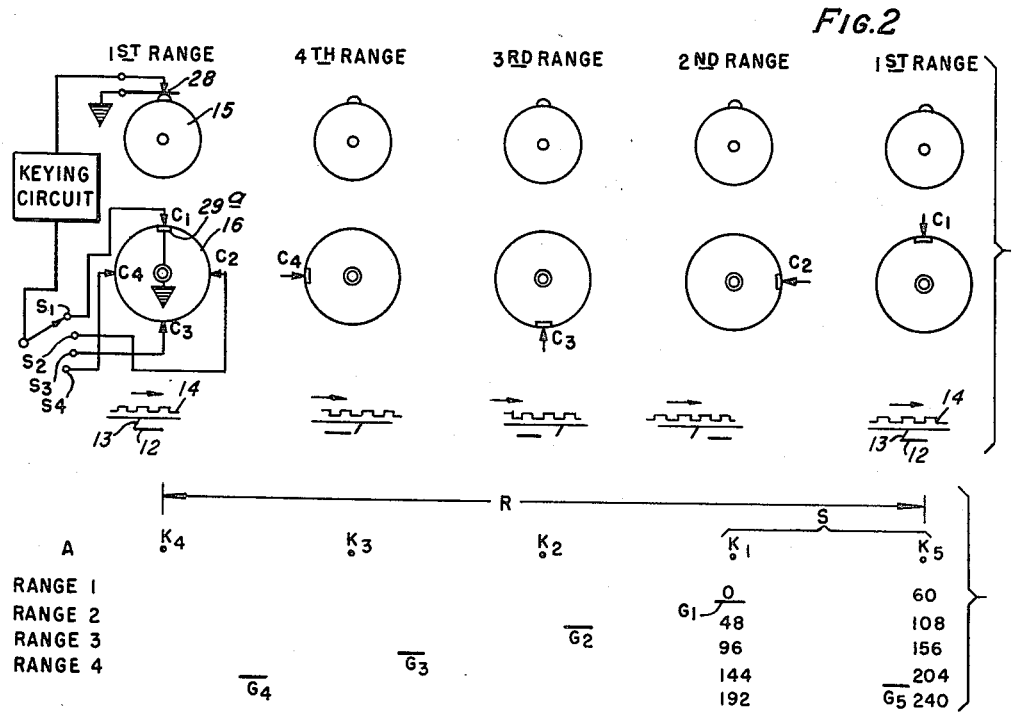
Fig.2
Fig.3
INVENTOR
W. J. Bischof
ATTORNEY United States Patent Office 2,941,183
Patented June 14, 1960

2,941,183

MULTI-RANGE ECHO SOUNDING SYSTEM

Walter J. Bischof, Van Nuys, Calif., assignor to Bendix Aviation Corporation, North Hollywood, Calif., a corporation of Delaware Filed Dec. 3, 1956, Ser. No. 625,801

10 Claims. (Cl. 340—3)

This invention relates to echo distance measurement and is particularly useful in depth sounding in water.

An object of the invention is to provide a simple, practical, and readily adjusted multi-range echo distance measuring apparatus.

Another object is to provide a multi-range echo distance indicating apparatus in which proper phasing of transmitted pulses in all ranges is controlled by a single adjustment.

Another object is to provide a compact and inexpensive apparatus for selectively timing the transmission of pulses at any one of predetermined different times to measure different distant ranges.

Another object is to provide a multi-range distance indicator in which the selected range is clearly identified.

Another object is to provide a distance indicator driven by a synchronous electric motor, in which non-synchronous operation of the motor may be readily detected.

Other more specific objects and features of the invention will appear from the description to follow.

Multi-range depth recorders of the single speed type employ a stylus recurrently moving through a scanning path calibrated in terms of the lowest range, and when operating in a deeper range, a fixed depth must be added to the indicated depth. Thus if the scale reads from 0 to 60 fathoms and operation is in a second range between 60 and 120 fathoms, 60 fathoms must be added to the direct scale reading.

In such a system, the range is varied by changing the time of transmission. Thus for the shallowest range the outgoing pulse is transmitted at the instant the indicating element (stylus) enters the scanning path, but for the second range the time of transmission may be advanced by the time required for the indicating element to traverse the scanning path (the scanning period). In most prior multi-range depth recorders of this type, the stylus is carried by a belt that is long as compared to the scanning path, and the time (repetition period) between successive entries of the stylus into the scanning path is many times greater than the scanning period. In such systems it has been common to employ a plurality of keying switches at spaced intervals along the path of the belt, and successively actuated by a switching member on the belt, only one of the switches being connected to the transmtiter for any given range of operation. This method has the disadvantage that each switch must be individually adjusted to insure proper phasing of the transmitted pulse in all ranges. Also, the actuation of the switches from the belt is an undesirable mechanical feature.

In accordance with the present invention, a stylus-moving belt may be used, but it is of the sprocket type in positive drive relation to the pulleys, and all switches are actuated by the pulleys. This in itself is not new. However, in the present invention one switch termed the keying switch is operated by one pulley at short intervals, usually equal to the scanning period, and a second switch termed the gating switch is operated from another pulley and serves to connect the keying switch to the transmitter only once during each repetition period. The single keying switch determines the exact phasing of the transmitted pulse in all ranges, and its adjustment for one range phases it in all ranges.

Further in accordance with the invention, the pulley driving the gating switch runs slightly slower or faster than the keying pulley such that it prepares as many ($n$) different keying circuits during each repetition period as there are ranges, each successive gating switch closure overlapping a keying switch closure so that any range is selected by completing the appropriate keying circuit. This makes possible a small gating pulley instead of one many times larger than the keying pulley, or, alternatively, instead of using additional gears or belts and pulleys to obtain a large speed reduction.

The invention is applicable both to systems in which consecutive ranges are continuous and to systems in which consecutive ranges overlap each other.

It is common to drive depth sounding devices by synchronous electric motors to obtain the constant speed necessary for accurate soundings. The motors are quite small and of self starting types capable of running at less than synchronous speed if overloaded. It is desirable therefore to be able to quickly check for synchronous or non-synchronous operation. In accordance with the present invention, this is done by making the repetition period of the indicating element a multiple or sub-multiple of the period of the alternating current energizing the motor and providing a switch for selectively energizing the indicating element from the A.C. source. When so energized, the indicating element produces successive indications at the same position in the scanning path if the motor is at synchronous speed. Lack of synchronism is indicated by successive indications appearing at successively lower depth indications.

A full understanding of the invention may be had from the following detailed description, with reference to the drawing, of a specific embodiment thereof.

In the drawing:

Fig. 1 is a schematic diagram of a system incorporating the invention.

Fig. 2 is a schematic diagram illustrating one mode of operation of the invention.

Fig. 3 is a schematic diagram illustrating an alternative mode of operation of the invention.

Fig. 1 shows the invention applied to a depth recorder in which a depth line 11 is drawn on a calibrated paper strip 12, the strip being calibrated transversely by longitudinal lines labelled 0, 10, 20, 30, 40, 50, 60 respectively. Finer graduation lines may be provided between those shown.

The line 11 is formed of dot-like increments produced by running the strip slowly to the right and intermittently energizing a stylus 13 that is periodically moved downward through a scanning path extending across the strip, each traverse of the stylus producing an increment of the line 11. The stylus 13 is mounted on a belt 14 trained over three sprocket pulleys 15, 16 and 17 and driven at constant speed by a synchronous motor M coupled to the pulley 17. The belt 14 is of the cog type so that there is no slippage between it and the pulleys. Potential pulses are applied to the stylus 13 through a brush 18 connected to the stylus and riding on a bus 19 during transit of the stylus through the scanning path. A ground strip 21 underlies the paper at the scanning path and completes a circuit from the stylus through the paper, which is of a type that is marked by passage of current therethrough. The bus 19 is normally connected through a back contact on a push button 23 to the output of a receiver 24, the input of which is connected to a transducer 25. The transducer 25 is also connected to a transmitter 26 which is actuated to transmit an electrical pulse when triggered by a keying circuit 27. The keying circuit 27 is actuated periodically in response to simultaneous closure of a keying switch 28 associated with the pulley 15 and a gating switch 29 associated with the pulley 16. Thus the input circuit of the keying circuit 27 includes in series relation a battery 31, the keying switch 28, a range selector switch 32 and one contact of the gating switch 29. The system disclosed has four ranges and hence has four contacts on the range selection switch 32 and four equally spaced contacts on the gating switch 29, a different one of which is connected to ground by a segment 29a during successive quarter revolutions of the pulley 16.

In operation, with the selection switch 32 in the position shown, the apparatus is adjusted for sounding in the first range from 0 to 60 fathoms. The apparatus is shown in the position at which the stylus 13 is just crossing the "0" graduation on the paper tape 12, at which time the keying switch 28 is closed by a cam 15a on the pulley 15, and the gating switch 16 has completed a circuit from ground through the range selection switch 32. The closure of the keying switch 28 actuates the keying circuit 27 to cause the transmitter 26 to transmit a pulse of power to the transducer 25 energizing the latter to transmit a sonic wave. This wave is transmitted down through the water until it strikes some object, such as the bottom, from which it is reflected back to the transducer 25, stimulating the latter to generate an electric pulse which is received by the receiver 24, and caused to produce a stylus-energizing pulse that is transmitted through the push button switch 23, the bus 19, and the brush 18 to the stylus 13, energizing the latter to produce a mark on the paper 12. Obviously the position of the mark is determined by the distance that the stylus 13 has traveled since the transmitted pulse was sent.

As shown in Fig. 1, the pulley 15 has a peripheral length equal to the length of the scanning path across the paper tape, that is, the distance between the 0 graduation and the 60 graduation, and the belt 14 is four times the length of the scanning path. Therefore the pulley 15 makes four revolutions during each repetition period, and the cam 15a closes the keying switch 28 four times during each repetition period.

The pulley 16 has a diameter one and one-quarter times that of the pulley 15 so that it makes three-quarters of a revolution while the pulley 15 is making one revolution, and makes three complete revolutions while the pulley 15 is making four complete revolutions. Therefore the segment 29a contacts the contact C1 once in each repetition period for a short interval while the stylus 13 is crossing the 0 graduation on the record strip. It will be apparent that when the range selection switch is on the first contact S1, as shown, it will prepare a circuit to the keying switch 28, which circuit is closed by the keying switch at the instant the stylus crosses the 0 graduation.

If it is desired to record in the second range, that is, the range from 60 to 120 fathoms, the selection switch 32 is moved on to the second contact S2 to complete a circuit to the contact C2 of the gating switch. Since the pulley 16 turns three-fourths of a revolution during each revolution of pulley 15, the switch segment 29a regresses one-quarter turn in counter-clockwise direction between successive rotations of the pulley 15 and the resultant closures of the keying switch 28. Therefore the segment 29a will close on the contact C2 coincident with the closure of the keying switch 28 preceding the rotation of the pulley 15 that brings the stylus 13 to the starting line on the chart, and the stylus will cross the chart while echoes from distances from 60 to 120 fathoms are received.

A clear understanding of the operation of the gating switch will be obtained from inspection of Fig. 2 which shows the positions of the pulley 16, and the positions of the stylus 13 with respect to the record 12, at the start of successive revolutions of the pulley 15.

In the first range, at the time of closure of the keying switch 28, the gating segment 29a is under the contact C1 and the stylus 13 is at the starting edge of the record 12.

After one rotation of the pulley 15 the segment 29a on the pulley 16 is under the contact C4 which is active when the selection switch 32 is set for the fourth range. At this time the stylus 13 is leaving the scanning path and will enter it again after three revolutions of the pulley 15 which are equivalent to 180 fathoms of distance. Therefore distances in the fourth range between 180 and 240 fathoms are recorded when the selector switch 32 is set on contact S4.

After two rotations of the pulley 15, the segment 29a on pulley 16 is under the contact C3 which is active when the selection switch 32 is set for the third range. At this time the stylus 13 is so positioned that it will again enter the scanning path after two revolutions of the pulley 15, equivalent to a distance of 120 fathoms, so that distances in the third range between 120 and 180 fathoms are recorded when the selector switch 32 is set on contact S3.

After three rotations of the pulley 15, the segment 29a on the pulley 16 is under the contact C2 which is active when the selection switch 32 is set for the second range. At this time the stylus 13 is in such position that it will again enter the scanning path after one revolution of the pulley 15, which is equivalent to 60 fathoms, so that distances in the second range between 60 and 120 fathoms are recorded when the selector switch 32 is set on contact S2.

After four revolutions of the pulley 15, the pulley 16 has made three complete revolutions bringing the segment 29a again under the contact C1, and a cycle has been completed.

It is not necessary that the pulley 16 be larger and rotate slower than the pulley 15. It can be smaller and rotate faster. The requirement to be met in a four range system as shown in Fig. 1 is that the pulley 16 must make one more or one less complete revolution during each repetition period, than the pulley 15. This means that the ratio of the diameter of the puley 16 to the diameter of the pulley 15 can be either three-fourths or one and one-fourth so that after each rotation of the pulley 15 the segment 29a has either advanced or regressed one-quarter turn.

From the foregoing, it is apparent that in terms of physical dimensions: (1) the length of the belt 14 is a multiple of the peripheral length of pulley 15; (2) the ratio of the peripheral length of the pulley 16 to the peripheral length of the pulley 15 can be $$\frac{n\pm1}{n}$$

(3) the length of the scanning path (the width of the graduated record strip) is the peripheral length of the pulley 15.

In terms of time: (1) the repetition period (the time between successive entries of the stylus into the scanning path) is a multiple of the keying period (the time between successive closures of the keying switch 28); (2) for consecutive ranges (as distinct from overlapping ranges) the scanning period is the same as the keying period; (3) the ratio of the period between successive closures of any one of the gating contacts C1, C2, C3 or C4 to the keying period can be $$\frac{n\pm1}{n}$$

The keying switch 28 causes the transmission of a pulse at the instant of its closure, and the exact time of closure can be adjusted to properly phase the time of transmission with respect to the time of entry of the stylus into the scanning path. One method of adjustment is to shift the stationary contact 28a by a thumbscrew 28b. One adjustment sets the phasing for all ranges. The gating switch 29 closes each gating circuit for a sufficient interval of time to overlap a keying switch closure in any adjustment of the keying switch.

To provide an indication of the range that is in operation, a plurality of range styluses 34, 35, 36, and 37 are provided juxtaposed to the record indicia 10, 20, 30 and 40 respectively, and a switch 38 that is ganged with the switch 32 applies potential from a source 39 to the appropriate range stylus. The energized stylus draws a continuous line 41 through the juxtaposed record indicia. Thus a line through the indicia 10 indicates the first (direct reading) range, a line through the indicia 20 indicates the second range, etc.

Fig. 3 illustrates a modified mode of operation of the invention to provide overlapping ranges. The distance R represents a repetition period of cycle of the scanning stylus. The dots K1, K2, K3, K4, K5 show the times of closure of the keying switch 28. The dashes G1, G2, G3 and G4 show the periods during which the different gating switches are closed.

It will be noted that when operating in range 1 the gating switch G1 is closed in overlapping relation with the keying closure K1 that occurs at the time of entry of the stylus into the scanning path. As before, the range covered by the scanning path is 0 to 60 fathoms. Range 2, however, instead of covering the succeeding range of from 60 to 120 fathoms covers the range from 48 to 108 fathoms. Therefore, the keying period instead of being the same as the scanning period is four-fifths of the scanning period. The third range is from 96 to 156 fathoms and the closure K3 of the keying switch is advanced one and three-fifths scanning periods. The fourth rang range extends from 144 to 204 fathoms and the time (K4) of closure of the keying switch for this range is advanced two and two-fifths scanning periods. The fifth range extends from 192 to 240 fathoms and the time (K5) of closure of the keying switch for this range is advanced three and one-fifth scanning periods.

To modify Fig. 1 to operate in the manner depicted in Fig. 3 requires the reduction of the peripheral length of the pulley 15 to one-fifth of the length of the belt 14 so that five complete rotations of the pulley 15 occur during each repetition period. However, the relative speeds of the pulleys 15 and 16 are the same as before, namely the ratio of the speed of the pulley 16 to that of pulley 15 is $$\frac{n \pm 1}{n}$$

$n$ being the ratio of the keying period to the repetition period (5 in this instance). For operation in accordance with Fig. 3, the contacts C1, C2, C3 and C4 on the gating switch would be spaced one-fifth of a revolution apart, and an additional contact provided between contacts C4 and C1 to provide the fifth range.

A check to determine whether or not the motor M is running at synchronous speed with its supply source can be easily made at any time by depressing the push button switch 23 for a few repetition periods. This applies pulses from a wave shaper 43 to the stylus 13, causing it to make a mark on the record during each cycle of alteration of the A.C. source. The wave shaper 23 may be of a well known type which, for example, suppresses the negative halves of the A.C. power wave and produces a brief sharp pulse in response to each positive half cycle. The size of the pulley 17 is so chosen that the repetition period is a multiple of the period of the A.C. power supply. Under these conditions, when the motor M is running in synchronism, and the push button 23 is depressed, a series of dots 44 forming a line extending longitudinally of the record sheet are produced. On the other hand, if the motor M is running at less than synchronous speed, the dots will be formed in a descending line 45. The switch 23, as shown, cuts off the output from the receiver 24 while synchronism is being checked so that the depth line 11 is interrupted. However, this is not essential and the output of the receiver 24 can be permanently connected to the bus 19. Under such conditions, there may be occasional situations where the synchronizing line will be superimposed on the depth line 11. The wave shaper 43 is desirable but not essential. The A.C. source may be connected directly to the switch 23. Without the wave shaper, the stylus 13 draws a series of vertical dashes instead of a series of dots, but the upper ends of the dashes give the desired indication.

Although for the purpose of explaining the invention a particular embodiment thereof has been shown and described, obvious modifications will occur to a person skilled in the art, and I do not desire to be limited to the exact details shown and described.

I claim:

1. In a multi-range echo distance indicating system having $n$ ranges: transmitting means adapted to be keyed to transmit a pulse of traveling waves; keying circuit means adapted to be energized to key said transmitter; receiving means for receiving echo pulses resulting from reflection of said traveling waves and generating indicator-energizing pulses in response thereto; indicating means including an indicating element movable through a scanning path and energizable by said energizing pulses to produce an indication of its position in said path at the time of reception of an echo pulse; means for cyclically moving said indicating element into said scanning path at a constant repetition period and through said path in a fixed scanning period; a keying switch means, and means for periodically closing it at predetermined intervals to determine the exact timing of transmitted pulses; a gating switch means comprising $n$ switch elements; means for sequentially closing a different gating switch element in overlapping relation with each successive closure of said keying switch means; range-selecting means for selectively preparing any one of $n$ energizing circuits to said keying circuit means, each energizing circuit including in series connection said keying switch means and a different one of said gating switch elements, whereby said transmitter is keyed once during each repetition period in response to only that closure of said keying switch means occurring during closure of the gating switch element in the selected energizing circuit.

2. Apparatus according to claim 1 in which said scanning period is a sub-multiple of said repetition period.

3. Apparatus according to claim 1 in which said means for actuating said keying and gating switch means comprises first and second rotary members associated respectively with said keying and gating switch means and means intercoupling said members for rotation at different relative speeds such that the ratio of their speeds is $$\frac{n \pm 1}{n}$$

4. Apparatus according to claim 3 in which the ratio of said repetition period to said scanning period is $n$.

5. Apparatus according to claim 1 in which the intervals of actuation of said keying switch equal said scanning period.

6. Apparatus according to claim 1 in which the interval of actuation of said keying switch is less than said scanning period.

7. Apparatus according to claim 3 in which said means for moving said indicating element comprises a plurality of sprocket wheels and a belt trained over said wheels in positive driving relation therewith, two of said pulleys constituting said first and second rotary members and having diameters in the ratio of $$\frac{n}{n \pm 1}$$

8. Apparatus according to claim 7 in which the peripheral lengths of said two pulleys are each a sub-multiple of the length of said belt.

9. Apparatus according to claim 1 in which said indicating means comprises a paper strip and means for moving it transversely across said scanning path, and said indicating element comprises a stylus for producing a mark on said strip when energized, said strip having sets of calibrations extending thereacross and each set including transversely spaced symbols indicative of successive ranges, a separate stationary stylus juxtaposed to each of said symbols, and means controlled by said range-selecting means selectively energizing the stationary stylus juxtaposed to the symbol corresponding to the selected range.

10. An echo distance indicating system comprising: transmitting means adapted to be keyed to transmit a pulse of traveling waves; receiving means for receiving echo pulses resulting from reflection of said traveling waves and generating indicator-energizing pulses in response thereto; indicating means including an indicating element movable through a scanning path and energizable by said energizing pulses to produce an indication of its position in said path at the time of reception of an echo pulse; an A.C. synchronous motor and means coupling it in driving relation to said indicating element for periodically driving it into and through said scanning path; a source of alternating current for energizing said motor; means for keying said transmitting means in timed relation to movement of said indicating member in the said path; means for selectively energizing said indicating element from said A.C. source; the ratio of the normal repetition period of said indicating element to the period of said alternating current being an integer, whereby a pulse of said alternating current occurs at the same position of said indicating element in successive cycles thereof when said motor is at normal speed in synchronism with said source, and at different positions in successive cycles thereof when said motor is out of synchronism with said source.

References Cited in the file of this patent
UNITED STATES PATENTS
2,610,244   Wolf _____ Sept. 9, 1952